United States Patent [19]
Asaoka et al.

[11] Patent Number: 4,598,868
[45] Date of Patent: Jul. 8, 1986

[54] FERTILIZER SPREADER HAVING DISPERSING SPACE FORMED BETWEEN FRONT END OUTLET AND A CLASH PART

[75] Inventors: Yoshitaka Asaoka, Towada; Takeo Higuchi, Aomori; Yoshiharu Kuji, Towada, all of Japan

[73] Assignee: Sasaki Nouki Kabushiki Kaisha, Aomori, Japan

[21] Appl. No.: 660,498

[22] Filed: Oct. 12, 1984

[51] Int. Cl.⁴ .................... A01C 15/00; B05B 1/26
[52] U.S. Cl. .................... 239/659; 239/689; 239/498; 239/499; 239/504; 239/518
[58] Field of Search ........... 239/650, 659, 664, 688, 239/689, 518, 524, 499, 504, 548, 498

[56] References Cited

U.S. PATENT DOCUMENTS

| 967,096 | 8/1910 | Wood | 239/498 X |
|---|---|---|---|
| 2,594,798 | 4/1952 | Poe | 239/548 X |
| 3,046,025 | 7/1962 | Vissers | 239/659 |
| 3,843,029 | 10/1974 | Bezzecchi | |
| 3,942,726 | 3/1976 | Oosterling et al. | 239/689 X |
| 3,979,072 | 9/1976 | Oosterling et al. | 239/689 |

FOREIGN PATENT DOCUMENTS

| 651651 | 11/1962 | Canada | 239/659 |
|---|---|---|---|
| 665055 | 6/1963 | Canada | 239/659 |
| 58-50617 | 4/1983 | Japan | |
| 835687 | 5/1960 | United Kingdom | 239/659 |

*Primary Examiner*—Joseph F. Peters, Jr.
*Assistant Examiner*—Mary Beth O. Jones
*Attorney, Agent, or Firm*—Frishauf, Holtz, Goodman & Woodward

[57] ABSTRACT

In a fertilizer spreader having a reciprocatively swinging distributor pipe, a distributing device is secured to the front end outlet of the distributor pipe. The distributing device comprises an upper part; a bottom part forwardly upwardly inclined and upwardly bent at both sides form a pair of inclined side plates; and a front clash part provided with an opening therein and interconnecting the upper and bottom parts, whereby the discharge speed, direction and timing of the fertilizer discharged from the outlet of the distributory pipe are variously changed so as to spread the fertilizer relatively uniformly.

19 Claims, 6 Drawing Figures

FERTILIZER SPREADER HAVING DISPERSING SPACE FORMED BETWEEN FRONT END OUTLET AND A CLASH PART

BACKGROUND OF THE INVENTION

This invention relates to a fertilizer spreader utilizing a swinging-type distributor pipe, and more particularly a distributory device thereof.

With this type spreader, a powder-like fertilizer fallen into the distributor pipe is distributed by the centrifugal force generated from the reciprocatively swinging movement of the distributor pipe. However, there is a tendency that a relatively large amount of the fertilizer is distributed at the time of turning of the distributor pipe at the critical points of the swinging motion thereof.

In order to have uniform distribution, U.S. Pat. No. 3,843,029 proposed to provide a shell-shaped spreading spout at the outlet end of a distributor pipe. With this spreading spout, however, as a fertilizer is merely guided by the upward slope formed on the bottom of the spout in forward, right and left directions, the obtained effect of uniformity is not satisfactory, and further the centrifugal force applied on the fertilizer is weakened during guidance by the slope so that the distribution range is minimized.

Another device has been disclosed in U.S. Pat. No. 3,979,072 wherein the outlet end of a distributor pipe is horizontally surrounded by a thin belt-shaped bracket for affecting the distribution pattern of materials to be spread. With this bracket, however, merely insufficient uniformity is obtained, and further the bracket may be fallen away from the body or destroyed during distribution as the distribution pipe reciprocatively swings at such high frequency as around 560 rpm and strong wind-pressure is applied thereto especially when the pipe returns.

SUMMARY OF THE INVENTION

Accordingly, it is an object of this invention to provide a fertilizer spreader capable of uniformly distributing the fertilizer.

Another object of this invention is to provide a fertilizer spreader capable of decreasing the disadvantageous affects caused by the wind-pressure.

According to this invention, there is provided a fertilizer spreader wherein a distributor pipe is reciprocatively swung for discharging the fertilizer, which comprises a distributing device to be attached to the front end of the distributor pipe comprising: an upper part; a bottom part forwardly upwardly inclined, said bottom part being upwardly bent at both sides to form a pair of inclined side plates; and a front clash part provided with at least two openings, said front clash part interconnecting said upper and bottom parts.

DESCRIPTION OF THE ACCOMPANYING DRAWINGS

DESCRIPTION OF THE PREFERRED EMBODIMENT

Figure 1:
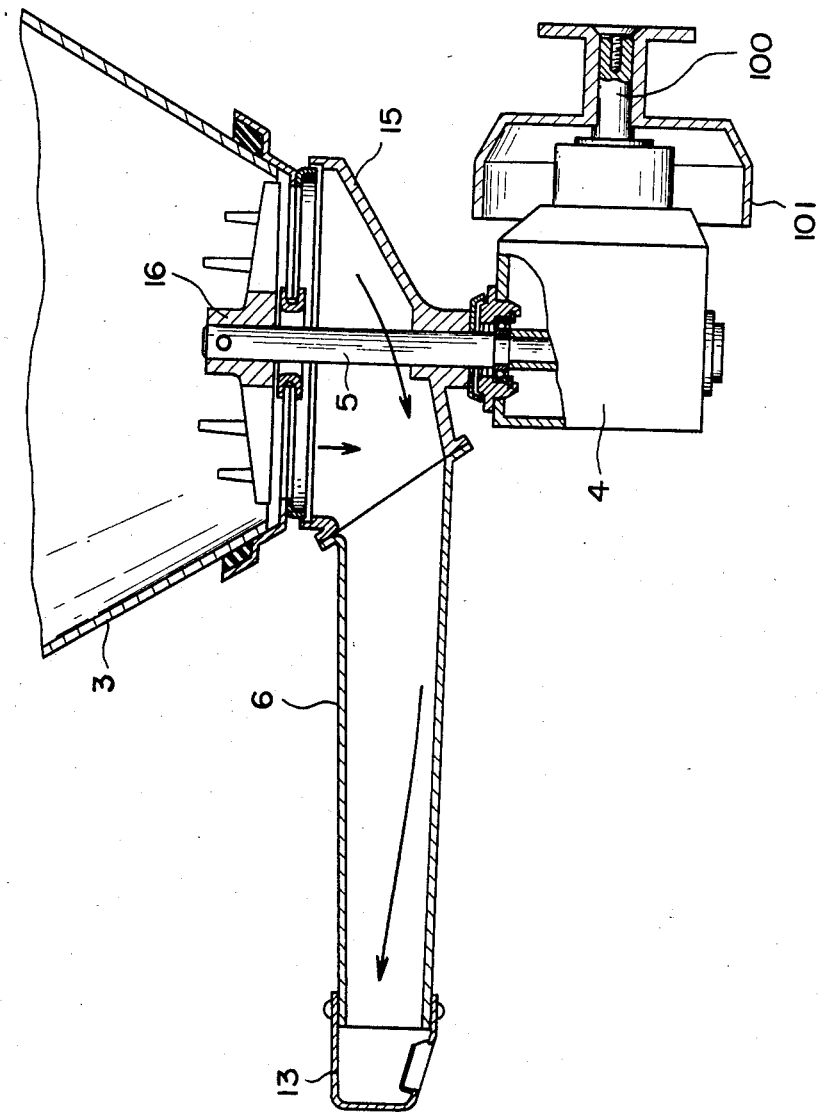
FIG. 1 is a partially-sectional side view of a fertilizer spreader embodying the invention.

As shown in FIG. 1, in a fertilizer spreader to be connected to and carried by a tractor and so on, a distributor pipe 6 is connected to a receiving funnel 15 secured to a central shaft 5 and positioned between a hopper 3 and a driving mechanism 4.

A connecting shaft 100 is connected to a power source, not shown, such as the power take-off shaft of the tractor, and the rotary motion of the connecting shaft 100 is converted to and transmitted to the central shaft 5 as the reciprocatively swinging motion through the driving mechanism 4 as disclosed in Japanese Patent Application No. 147280/1981 (corresponding to Japanese laid-open Application No. 50617/1983, which was laid open for public inspection on Apr. 6, 1983). On the connecting shaft 100, a flywheel 101 is mounted for preventing the shaking rotation thereof.

Figure 2:
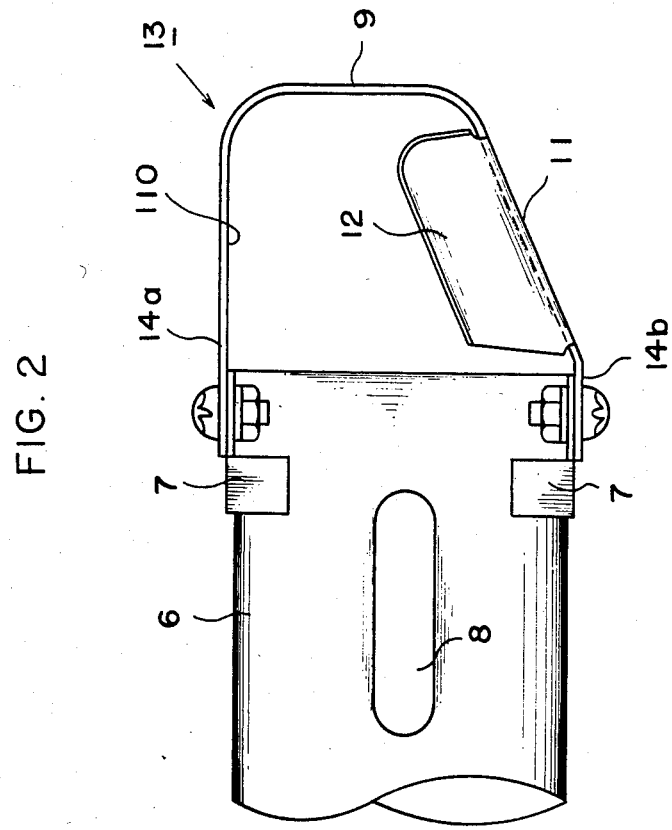
FIG. 2 is a side view of a distributory device.
Figure 3:
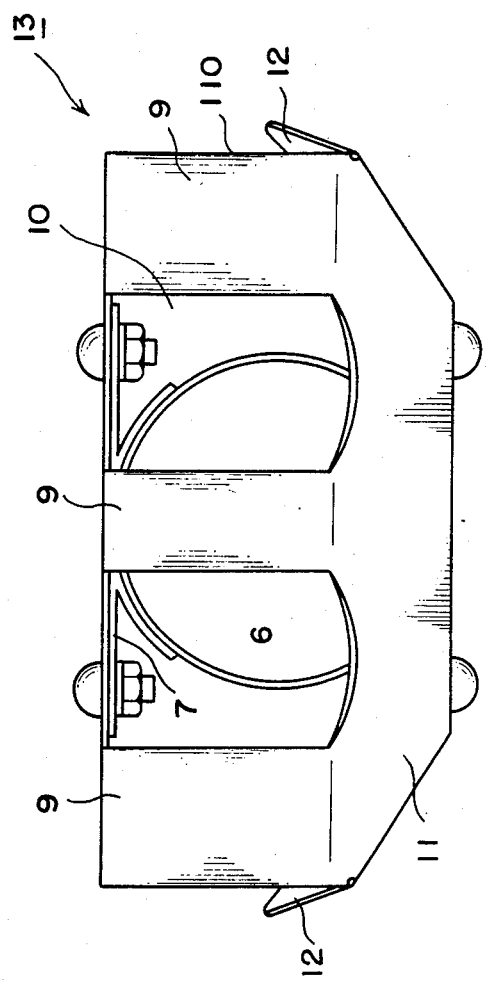
FIG. 3 is a front view thereof.
Figure 4:
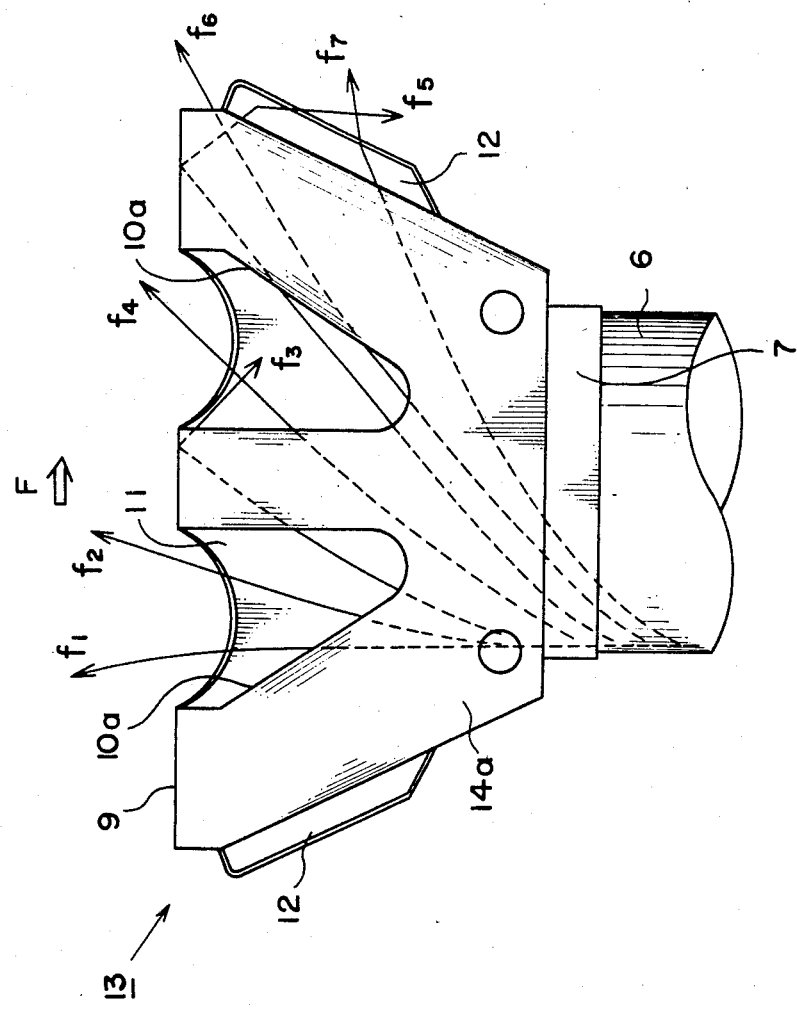
FIG. 4 is a plan view thereof.

Turning to FIGS. 2 to 4, a distributory device 13 secured to the outlet of the distributor pipe 6 by a pair of fixers 7, 7 is formed of a thin metalic plate and comprises a front clash part 9, a bottom part 11 and an upper part 14a. The distributory device 13 defines a dispersing space in front of the outlet of the distributor pipe 6, as will be clear from the following.

The front clash part 9 stands vertically in front of the outlet of the distributor pipe 6 at around two-thirds upper area thereof, as shown particulaly in FIG. 3, and is divided into three pieces by a pair of rectangular openings 10, 10. The openings 10, 10 are arranged symmetrically side to side about the center of the outlet of the distributor pipe 6, and are provided with arc-shaped lower ends.

The bottom part 11 has a fan-shaped bottom portion which extends from the lower end of the front clash part 9 in a downward direction toward the outlet of the distributor pipe 6. The bottom part 11 is also inclined upwardly at both sides thereof to form a pair of inclined side plates 12, 12. Each side plate 12 is arranged to position the front upper edge thereof around the central axis of the distributor pipe 6 as shown in FIG. 2.

As seen in FIG. 4, the upper part 14a extending from the upper end of the front clash part 9 is also fan-shaped and provided with a pair of triangular openings 10a, 10a extending from openings 10, 10.

A pair of longitudinal side slots 8 (8) are formed on the distributor pipe 6 near the outlet thereof, one of which is shown in FIG. 2.

With the fertilizer spreader as above constructed, as the front area of the distributory device 13 is closed by the clash part 9 except for the openings 10, 10, the direct forward discharge of the fertilizer is partly prevented. The portion of the fertilizer prevented from being directly fowardly discharged, is rebounded to be discharged from side openings 110, 110 or to be discharged from front openings 10, 10 at delayed timings.

Further, as the bottom part 11 is fan-shaped and forwardly upwardly inclined, the fertilizer discharged from the lower area of the outlet of the distributory pipe 6 clashes thereagainst and is guided by the inclined bottom part 11 so that the centrifugal force applied to the fertilizer, i.e. the discharged speed thereof is decreased and simultaneously the fertilizer is diffused on the bottom part 11.

Moreover, as each side plate 12 is further upwardly inclined, the speed of the fertilizer guided and discharged along the side plate 12 is further decreased.

Thus, the discharge speed, direction and timing of the fertilizer discharged from the outlet of the distributory pipe 6 is variously changed when it passes through the distributory device 13 in such a manner as the amount of the fertilizer to be spread out can be relatively uniform in two-dimensional directions.

The above effects are much more effective when the distributory pipe 6 changes its swinging direction.

For instance, the distribution direction of the fertilizer discharged from the outlet of the distributor pipe 6 around the turning point of the swinging direction thereof varies from f1 to f7 as indicated in FIG. 4 wherein the swinging direction of the distributor pipe 6 is going to change from rightward to leftward. That is, during the rightward swinging, the fertilizer is guided and discharged along the left side inner surface of the distributor pipe 6 and is spread mainly in the direction f1, but the direction gradually changes as the swinging speed of the distributor pipe 6 is rapidly decreased when it approaches the turning point of its swinging direction while the fertilizer tends to be forwarded in the right direction by inertia applied upon its discharge from the outlet of the distributor pipe 6.

When the distribution direction varies to f3 or f5 the fertilizer clashes against the center piece or the right piece of the front clash part 9 so that the centrifugal force, i,e, the spreading speed thereof is decreased and the spreading direction is changed. This means that the fertilizer discharged in the direction of f3 or f5 is spread out from the right side plate 12 at a delayed timing.

The fertilizer discharged in the direction of f7 also clashes against the right side plate 12, and thus the centrifugal force, i.e. the spreading speed thereof is decreased. On the contrary, the fertilizer discharged in the direction of f1, f2, f4 or f6 is spread out without decreasing its spreading speed.

Accordingly, the fertilizer discharged in the direction of f1,f2, f4 or f6 is spread around the area of the turning point of the distributor pipe 6, while the fertilizer discharged in the direction of f3, f5 or f7 is spread out in the intermediate area from the turning point to the central point of swinging movement of the distributor pipe 6.

The above described is, of course, applicable in the case of the turning of the distributor pipe 6 from its leftward to rightward swinging.

Figure 5:
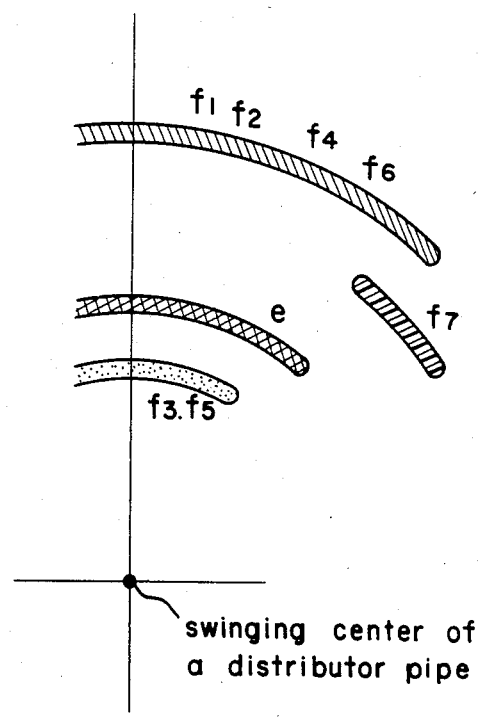
FIG. 5 is diagramatical view showing a distribution pattern.

FIG. 5 shows the distribution pattern of the fertilizer distributed by the above described spreader. The fertilizer discharged in the directions f1, f2, f4 and f6 is provided with large centrifugal force so that it is distributed in the furthest area, while the fertilizer discharged in the directions f3 and f5 is provided with little centrifugal force so that it is distributed in the nearest area. The fertilizer discharged in the direction f7 and the fertilizer e discharged from the side slot 8 is distributed in the middle area.

Figure 6:
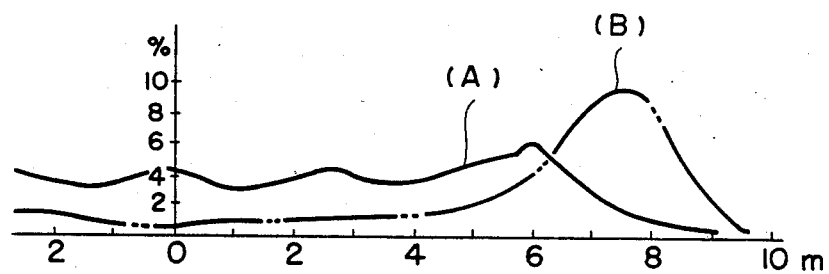
FIG. 6 is diagramatical view showing a distribution density.

Thus, uniformity of fertilizer distribution in two-dimensional directions is obtained. This can be further recognized from FIG. 6 which shows the distribution density (A) of the fertilizer distributed by the above described fertilizer spreader in comparison to that (B) of the fertilizer spreader without the distributory device 13.

The slot 8, 8 formed on the distributory pipe 6 is very advantageous for fusec phosphatic fertilizer.

Moreover, as both side-sections of the distributing device described above are almost fully open while the upper and lower sections are firmly constructed, the wind-pressure generated by the swinging movement of the distributor pipe 6 and applied to the distributing device itself is greatly decreased so that disadvantageous results such as damage and/or destruction of the distributing device are eliminated.

What is claimed is:

1. In a fertilizer spreader wherein a distributor pipe is reciprocatively swung for discharging of fertilizer through a front end outlet thereof, the improvements comprising a distributing device attached to the front end outlet of the distributor pipe comprising:

an upper part;
a bottom part including a forwardly upwardly inclined bottom portion, and a pair of inclined upwardly extending side plates at both opposite sides thereof, said side plates being connected to and extending upwardly from said bottom portion, said bottom portion being a substantially straight, upwardly inclined, plate-like portion having a width which gradually increases in a direction away from said front outlet end of said distributor pipe and toward a front clash part; and
said front clash part being spaced apart from said front end outlet of said distributor pipe in the direction of fertilizer discharge so as to form a fertilizer dispersing space therebetween, said front clash part interconnecting said upper and bottom parts, said front clash part including at least two spaced apart blocking portions opposite and blocking a part of said front end outlet of said distributor pipe and against which fertilizer impinges, and said front clash part having at least one opening between said at least two spaced apart blocking portions;
said dispersing space being defined by at least said front clash part, said upper part, and said upwardly inclined bottom portion and said side plates of said bottom part.

2. The fertilizer spreader according to claim 1 wherein at least one of said at least one opening of said front clash part is generally rectangular-shaped.

3. The fertilizer spreader according to claim 2 comprising a pair of slots formed at both sides of said distributor pipe near the front end outlet thereof.

4. The fertilizer spreader according to claim 1 wherein said inclined side plates have upper edges which are positioned at about the level of a central axis of the distributor pipe.

5. The fertilizer spreader according to claim 1 wherein said distrubutor device is formed of a thin metalic plate as one piece.

6. The fertilizer spreader according to claim 2 wherein said at least one generally rectangular-shaped opening comprises at least two generally rectangular-shaped openings which are arranged symmetrically side to side about the center of the outlet of the distributor pipe.

7. The fertilizer spreader according to claim 6 wherein said generally rectangular-shaped openings have arc-shaped lower ends.

8. The fertilizer spreader according to claim 2 wherein said at least one generally rectangular-shaped opening has an arc-shaped lower end.

9. The fertilizer spreader according to claim 1 wherein said upper part of said distributing device has at least one opening formed therein.

10. The fertilizer spreader according to claim 9 wherein said at least one opening of said upper part is generally triangular.

11. The fertilizer spreader according to claim 1 wherein said upper part of said distributing device has at least two openings formed therein.

12. The fertilizer spreader according to claim 11 wherein said at least two openings of said upper part are generally triangular.

13. The fertilizer spreader according to claim 3, wherein said upper part of said distributing device has at least one opening formed therein.

14. The fertilizer spreader according to claim 13 wherein said at least one opening of said upper part is generally triangular.

15. The fertilizer spreader according to claim 14 wherein said inclined side plates have upper edges which are positioned at about the level of a central axis of the distributor pipe.

16. The fertilizer spreader according to claim 3 wherein said at least one generally rectangular-shaped opening comprises at least two generally rectangular-shaped openings which are arranged symmetrically side to side about the center of the outlet of the distributor pipe.

17. The fertilizer spreader according to claim 6 wherein said upper part of said distributing device has at least one opening formed therein.

18. The fertilizer spreader according to claim 17 wherein said at least one opening of said upper part is generally triangular.

19. The fertilizer spreader according to claim 1, wherein said upwardly inclined side plates of said bottom part are integrally formed with said bottom portion and are upwardly bent from sides of said bottom portion.

* * * * *